United States Patent
Wise et al.

(10) Patent No.: US 8,154,793 B2
(45) Date of Patent: Apr. 10, 2012

(54) NONLINEAR CHIRPED PULSE FIBER AMPLIFIER WITH PULSE COMPRESSION

(75) Inventors: Frank W. Wise, Ithaca, NY (US); Lyuba Kuznetsova, Cambridge, MA (US); Chin Yu Chong, Ithaca, NY (US)

(73) Assignee: Cornell University, Ithaca, NY (US)

( * ) Notice: Subject to any disclaimer, the term of this patent is extended or adjusted under 35 U.S.C. 154(b) by 355 days.

(21) Appl. No.: 12/127,725

(22) Filed: May 27, 2008

(65) Prior Publication Data
US 2009/0002808 A1    Jan. 1, 2009

Related U.S. Application Data

(60) Provisional application No. 60/940,076, filed on May 25, 2007.

(51) Int. Cl.
*H04B 10/17* (2006.01)
*H01S 3/10* (2006.01)

(52) U.S. Cl. ............... 359/341.1; 359/341.5; 372/25

(58) Field of Classification Search .............. 359/333, 359/341.1, 341.5; 372/25
See application file for complete search history.

(56) References Cited

U.S. PATENT DOCUMENTS

| | | | | |
|---|---|---|---|---|
| 5,696,782 A * | 12/1997 | Harter et al. | | 372/25 |
| 5,818,630 A * | 10/1998 | Fermann et al. | | 359/341.31 |
| 5,847,863 A * | 12/1998 | Galvanauskas et al. | | 359/341.3 |
| 6,813,429 B2 * | 11/2004 | Price et al. | | 385/125 |
| 6,885,683 B1 * | 4/2005 | Fermann et al. | | 372/25 |
| 7,167,300 B2 * | 1/2007 | Fermann et al. | | 359/337.5 |
| 2004/0114641 A1 * | 6/2004 | Wise et al. | | 372/6 |
| 2004/0240037 A1 * | 12/2004 | Harter | | 359/333 |
| 2005/0008044 A1 * | 1/2005 | Fermann et al. | | 372/19 |
| 2005/0163426 A1 * | 7/2005 | Fermann et al. | | 385/37 |
| 2006/0120418 A1 * | 6/2006 | Harter et al. | | 372/30 |
| 2006/0159137 A1 * | 7/2006 | Shah | | 372/25 |
| 2006/0207976 A1 * | 9/2006 | Bovatsek et al. | | 219/121.69 |
| 2006/0285561 A1 * | 12/2006 | Shah et al. | | 372/21 |
| 2007/0002910 A1 * | 1/2007 | Liu et al. | | 372/25 |
| 2007/0047595 A1 * | 3/2007 | Liu et al. | | 372/6 |
| 2007/0047965 A1 * | 3/2007 | Liu et al. | | 398/147 |
| 2007/0103765 A1 * | 5/2007 | Fermann et al. | | 359/337.5 |
| 2007/0177643 A1 * | 8/2007 | Liu | | 372/30 |
| 2008/0130099 A1 * | 6/2008 | Harter | | 359/341.1 |

OTHER PUBLICATIONS

Kane et al. "Grating Compensation of Third-Order Material Dispersion in the Normal Dispersion Regime: Sub-100-fs Chirped Pulse Amplification Using a Fiber Stretcher and Grating-Pair Compressor", IEEE Journal of Quantum Electronics, vol. 31, No. 11, pp. 2052-2057 (Nov. 1995).*

Tamura et al. "Pulse compression by nonlinear pulse evolution with reduced optical wave breaking in erbium-doped fiber amplifiers", Optics Letters, vol. 21, No. 1, pp. 68-70 (Jan. 1996).*

* cited by examiner

*Primary Examiner* — Eric Bolda
(74) *Attorney, Agent, or Firm* — William A. Blake

(57) ABSTRACT

A chirped-pulse fiber amplification method and system operates with large nonlinear phase shifts (as large as ~20π or more). In this regime, the pulse spectrum is modified by strong self-phase modulation and gain shaping. With large-enough nonlinear phase shift, substantial spectral broadening occurs. The amplified spectrum can therefore be much broader than the spectrum that is obtained with small nonlinear phase shifts. The broader spectrum enables the formation of a shorter pulse, and the bandwidth generated in nonlinear chirped-pulse amplification can in fact be exploited to generate shorter pulses. Ultimately, this allows the generation of pulses shorter than the gain-narrowing limit of a fiber amplifier.

11 Claims, 2 Drawing Sheets

NONLINEAR CHIRPED PULSE FIBER AMPLIFIER WITH PULSE COMPRESSION

CROSS REFERENCE TO RELATED APPLICATIONS

This application claims the benefit, under 35 U.S.C. 119 (e), of U.S. Provisional Application No. 60/940,076, filed May 25, 2007, which is hereby incorporated by reference in its entirety.

GOVERNMENT SPONSORSHIP STATEMENT

This invention was made with Government support from the National Science Foundation under Contract No. ESC-0500596. The Government has certain rights in the invention.

BACKGROUND OF THE INVENTION

1. Field of the Invention

The present invention relates, in general, to short-pulse fiber amplifiers, and more particularly to a chirped pulse fiber amplifier which exploits large nonlinear phase shifts to produce shorter pulses. This avoids the pulse-broadening that generally occurs owing to the gain bandwidth of the amplifier.

2. Description of the Background Art

There is rapidly growing interest in the development of efficient, compact, and stable ultrafast lasers for a variety of applications from the study of fundamental ultrafast processes in nature to precision machining. Fiber lasers offer a number of practical advantages over bulk solid-state lasers, including compact size, better thermal stability, freedom from misalignment, and lower cost. On the other hand, the pulse energy from fiber sources has not been comparable to that of solid-state devices.

Nonlinearity generally limits the energy of ultrashort pulses. This limitation is particularly severe in fiber devices owing to the small core and long interaction lengths. Excessive self-phase modulation (SPM) leads to pulse distortions and eventually the pulse may break up. Scaling of fiber amplifiers to the microjoule- and millijoule-pulse energies will require creative solutions for nonlinearity management. Self-similar amplification is one way to control nonlinearity. However, gain-bandwidth limitations eventually disturb the monotonic chirp, and thus limit the pulse energy, to the microjoule level thus far.

A key component of the design of high-energy fiber devices is to increase the mode diameter using multimode or photonic-crystal fibers. This allows a 30-50 times increase in the pulse energy. However, there are practical and fundamental limits to the size of the lowest-order transverse mode, which is required for high beam quality. Increased mode size implies a trade-off in numerical aperture, sensitivity to alignment and bend loss.

For the highest energies, chirped-pulse amplification (CPA) is required, along with a large mode area. In CPA, a pulse is stretched to reduce the detrimental nonlinear effects that can occur in the gain medium. After amplification, the pulse is dechirped, ideally to the duration of the initial pulse. The stretching is typically accomplished by dispersively broadening the pulse in a segment of fiber or with a diffraction-grating pair. For pulse energies of microjoules or greater, the dechirping is done with gratings, to avoid nonlinear effects in the presence of anomalous group-velocity dispersion (GVD), which are particularly limiting. In most prior work, CPA systems were designed with matched stretcher and compressor dispersions, and operated with minimum nonlinear phase shift ($\Phi^{NL}$) accumulated by the pulse. For $\Phi^{NL} > 1$, the pulse duration and fidelity degrade. In other words, at low energy, the process of stretching and compression can thus be perfect. At higher energy, some nonlinear phase will be accumulated and this will degrade the temporal fidelity of the amplified pulse.

The total dispersion of a fiber stretcher differs from that of a grating pair, and this mismatch results in uncompensated third-order dispersion (TOD), which will distort and broaden the pulse, at least in linear propagation. At wavelengths where the fiber has normal GVD (such as 1 μm), the TOD of the fiber adds to that of the grating pair. Stretching ratios of thousands are used in CPA systems designed to generate microjoule and millijoule-energy pulses, in which case the effects of TOD would limit the dechirped pulse duration to the picosecond range. It has thus become "conventional wisdom" that fiber stretchers are unacceptable in CPA systems and, as a consequence, grating stretchers have become ubiquitous in these devices.

Published International Application No. WO 2006/113,507 to Wise et al. (hereinafter "Wise et al."), which was published on Oct. 26, 2006, discloses a fiber CPA system that contradicts the prior conventional wisdom. In Wise et al., high pulse energies and peak powers can be obtained from fiber amplifiers, when the pulse is allowed to accumulate a nonlinear phase shift $\Phi^{NL}$ which can compensate the third-order dispersion (TOD) in a fiber amplifier. More particularly, Wise et al. disclose a CPA system that employs a pulse stretcher and a pulse compressor which have dispersion characteristics that are mismatched to one another and thereby cause introduction of TOD during operation. While TOD would normally cause the amplified pulse to broaden to unacceptably-long duration, Wise et al. discovered that the TOD can be compensated by a nonlinear phase shift introduced into the system by either the amplifier or a dispersive fiber. The ratio of the nonlinear phase shift to the TOD is selected to reduce and preferably minimize the output pulse width of the compressor, which increases and preferably maximizes the peak power in the pulse.

SUMMARY OF THE INVENTION

The discovery of the unexpected behavior of the CPA system disclosed in Wise et al. has led to yet another unexpected way in which effects that were previously thought to be detrimental to performance of a CPA fiber system can in fact be combined to generate even higher energy, ultrashort pulses using an all fiber system. In particular, the inventors have now discovered that shaping (i.e. broadening) of the power spectrum of a pulse in an amplifier (which arises from nonlinear phase shifts as high as $12\pi$ or more) can be exploited to reduce the pulse duration proportionally. A shorter pulse duration is generally desirable, for better temporal resolution in measurements, or to create higher peak power with fixed pulse energy.

The influence of the gain spectrum in solid-state amplifiers has been studied extensively. Gain narrowing leads to distortion of the pulse spectral and temporal profiles. Among fiber devices, gain spectrum or bandwidth limitations have been considered in the context of self-similar amplification, but there has been no known treatment of this issue in fiber CPA. Because $\Phi^{NL} \ll \pi$ in prior CPA systems, the combination of strong nonlinearity and gain shaping has not been considered before. Wise et al. demonstrated that $\Phi^{NL}$ of $\pi$ or greater can be employed in a CPA system, though it was still presumed that any gain bandwidth modifications either could not be induced or would be detrimental if they were induced. The subject invention is the result of additional studies which confirm that use of CPA in the presence of strong SPM for values of $\Phi^{NL}$ up to ~20π can result in substantial (e.g. 100%) spectral broadening of the pulse. This is a significant discovery because when the spectral width of the pulse can be increased, the temporal duration can be decreased. When dechirped, the pulse reaches a duration that gets closer to the fundamental limit (i.e., the Fourier-transform limit for that spectrum) as the nonlinear phase shift increases. The output pulse may then be shorter than the standard limit from the gain bandwidth, and may even be shorter than the input pulse, but with much greater energy.

In the preferred embodiment, the stretcher consists of a segment of single-mode optical fiber. The amplifier is also preferably fiber, at least a section of which is doped with an element that provides the gain, such as ytterbium or erbium. Preferably, the fiber amplifier increases the peak power of the pulse sufficiently that a nonlinear phase shift is induced that is sufficiently large (e.g. 2π or greater) that the shape of the power spectrum of the pulse is substantially changed as it passes through the amplifier. This is in contrast to the CPA system in Wise et al., in which the spectrum of the pulse is not altered significantly. The compressor is preferably a dispersive delay line that is selected to generate a predetermined magnitude of TOD during operation with the stretcher and will most commonly be implemented with a pair of diffraction gratings.

In operation, the design of the three stages is such that the large nonlinear phase shifts accumulated by the pulse in the amplifier compensate the mismatch of dispersions of the fiber stretcher and grating compressor. The amount of nonlinear phase shift is preferably increased by increasing the gain in the fiber amplifier, which results in spectral broadening of the pulse. For given parameters of the stretcher, amplifier and compressor, an optimal value of the nonlinear phase shift can be identified, at which value the output pulse has the shortest duration, cleanest shape and highest peak power. The result is a fiber amplifier that, contrary to previous reports, can perform optimally and actually improves with large values of nonlinearity and resultant spectral broadening. The pulses generated using this technique can actually be shorter than the gain narrowing limit of the fiber amplifier. In the case of a ytterbium fiber amplifier, which has a gain narrowing limit of 120 femtoseconds, experiments using the technique of the subject invention have demonstrated generation of pulses of substantially less than 120 femtoseconds and even less than 100 femtoseconds.

BRIEF DESCRIPTION OF DRAWINGS

The various features of the invention are described in detail below, in conjunction with the accompanying drawings, which are briefly described as follows.

DETAILED DESCRIPTION OF A PREFERRED EMBODIMENT OF THE INVENTION

Figure 1A:
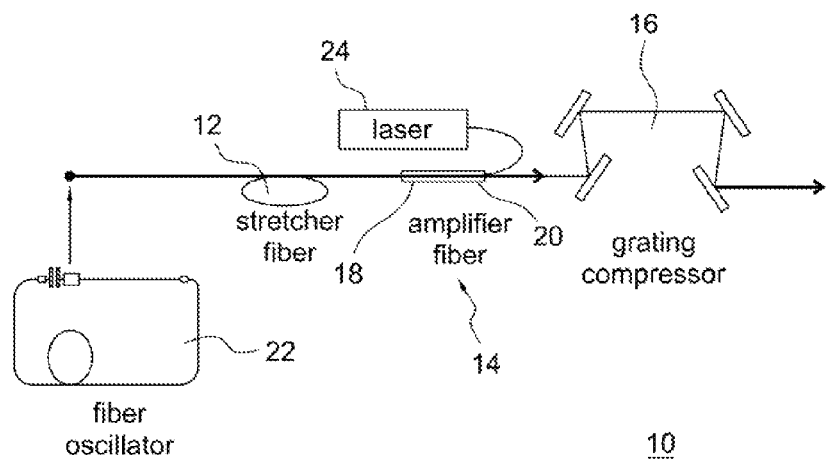
FIG. 1A is a schematic diagram of a CPA system that is constructed in accordance with a preferred embodiment of the present invention.

A chirped-pulse amplifier system 10 for generating high energy femtosecond-duration optical pulses that is constructed in accordance with a preferred embodiment of the present invention is illustrated in FIG. 1A. The CPA system 10 consists of three stages: a pulse stretcher 12, an amplifier 14 and a compressor 16. The stretcher 12 preferably consists of a segment of single-mode optical fiber (SMF). The amplifier 14 is also preferably implemented with fiber, at least a first section 18 of which is doped with an element that provides the gain, such as ytterbium or erbium. A second optional section 20 of undoped single mode fiber is preferably included, which can be used to add a selectable amount of nonlinear phase shift to the system 10 for reasons to be discussed shortly. The compressor 16 is a dispersive delay line which will most commonly be implemented with a pair of diffraction gratings. It should be understood that other types of elements could be used for the pulse stretcher 12 and compressor 16, such as grating stretchers, fiber Bragg gratings, volume Bragg gratings, or photonic-bandgap fibers, however, it is a requirement of the invention that the pulse stretcher 12 and pulse compressor 16 have dispersions that are mismatched to one another, to insure that there is residual TOD.

A Yb fiber oscillator 22 is a source of pulses to be amplified, although it should be understood that other types of pulse sources may be employed. Finally, a laser diode 24 acts as a pump source for the fiber amplifier 14. The oscillator 22 is connected to the pulse stretcher 12, which is connected to the amplifier 14, which in turn is connected to the pulse compressor 16. During operation, the oscillator 22 generates a series of pulses which are fed into the pulse stretcher 12. The pulse stretcher generates chirped (broadened in time) pulses that are then fed into the amplifier 14, which is selected to have a gain that induces a large nonlinear phase shift in the pulse and results in modification of the shape of the pulse's power spectrum. The amplified pulses are then fed into the compressor 16. Finally, the compressor 16 generates a plurality of compressed amplified pulses as output from the system 10.

Before the results of simulations and experiment will be given, a few points should be made. Third-order dispersion (TOD) is initially neglected to simplify the problem and isolate the main features. Once those are established, the effects of TOD are discussed. How the SPM and the gain spectral profile interact to modify the spectrum of the amplified pulse will be shown. A model that includes nonlinearity, group-velocity dispersion (GVD), TOD, and amplification with finite gain bandwidth accounts well for the experimental results.

In general, the dopant-induced gain can be included in the standard nonlinear Schrödinger equation (NLSE) by adding a source term. The resulting equation is:

$$\frac{\partial E}{\partial z} + \frac{\alpha}{2}E + \frac{1}{v_g}\frac{\partial E}{\partial t} + i\frac{\beta_2}{2}\frac{\partial^2 E}{\partial t^2} - \frac{\beta_3}{6}\frac{\partial^3 E}{\partial t^3} - i\gamma|E|^2 E = \qquad (1)$$
$$\frac{1}{2\pi}\int_{-\infty}^{\infty}\chi(\omega)\hat{E}(z,\omega)\exp(-i\omega t)d\omega$$

where $v_g$ is group velocity, $\omega_0$ is carrier frequency, $\alpha$ is the loss coefficient, $\gamma$ is the nonlinearity coefficient, $\beta_2$ is the GVD parameter, and $\beta_3$ is the TOD parameter. Assuming the population inversion to be constant along the amplifier length and that the amplifier operates at the gain peak ($\omega_0 = \omega_a$ where $\omega_a$ is the atomic resonance frequency), the susceptibility of the medium is given by:

$$\chi(\omega) = \frac{g_0}{2}\frac{(\omega-\omega_0)T_2 - i}{(\omega-\omega_0)^2 T_2^2 + 1} \qquad (2)$$

where $g_0$ is the small-signal gain coefficient and $T_2$ is the dipole relaxation time. The value for the gain bandwidth $\Delta\lambda_{FWHM} = \lambda 2\Delta v_g/c(\Delta v_g = 1/\pi T_2)$ is a variable parameter in the model. The parabolic gain approximation (PGA) can be obtained by expanding the susceptibility in a Taylor series around the carrier frequency of the pulse, and keeping up to the quadratic term. For large enough values of the gain bandwidth, the PGA and the Lorentzian gain profile (Eq. (2)) produce identical results.

Numerical simulations were employed to study a CPA system with a fiber stretcher, a fiber amplifier, and a grating compressor (the key elements of the experimental setup in FIG. 1A). The parameters of the simulations were taken as those of the experiments described below, to allow comparison of theory and experiment. The seed pulse was taken to be a 140 fs soliton at 1030 nm. After stretching in 400 m of single-mode fiber (SMF), the pulse duration is 150 ps.

To facilitate variation of $\Phi^{NL}$ over the desired range (up to ~12π), 4 m of SMF was placed after the 1 m of Yb amplifier. Simulations show that under these conditions the spectral shaping is the same as when the $\Phi^{NL}$ is accumulated directly in the amplifier. The NLSE that governs propagation in each section is solved by the standard split-step technique. The gain bandwidth $\Delta\lambda_{FWHM}$ and nonlinear phase shift were varied across large ranges in the simulations, and the most important trends will be summarized.

Large values of the gain bandwidth, such as $\Delta\lambda_{FWHM} = 100$ nm allow decoupling of the effects of SPM and finite gain bandwidth. FIG. 2(a)-2(d) show that for $\Delta\lambda_{FWHM} = 100$ nm, increasing the value of $\Phi^{NL}$ leads to some broadening of the amplified pulse spectrum.

Simulations with $\Delta\lambda_{FWHM} = 12$ nm illustrate the effects of the finite gain bandwidth in the presence of significant nonlinear phase shift (FIGS. 2(e)-2(h)). With $\Phi^{NL} < \pi$, gain narrowing is observed, as expected (FIG. 2(e)). With increasing $\Phi^{NL}$, gain shaping and SPM interfere with each other to produce the characteristic spectral shapes of FIGS. 2(f)-2(h). Inclusion of stimulated Raman scattering and TOD in the calculations does not alter the spectra under these conditions.

Figure 1B:
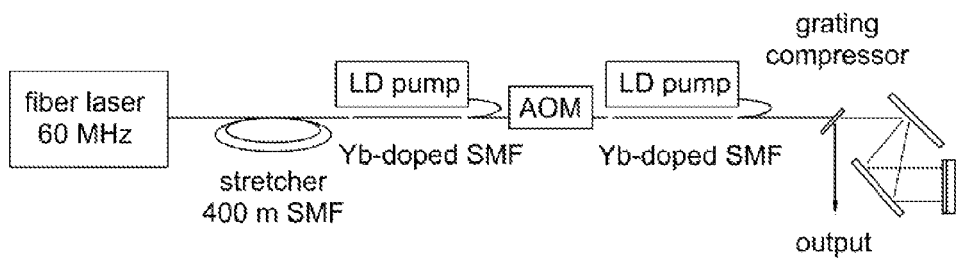
FIG. 1B is a schematic diagram of an experimental setup that was employed to test the operational theory of the present invention.
Figure 2:
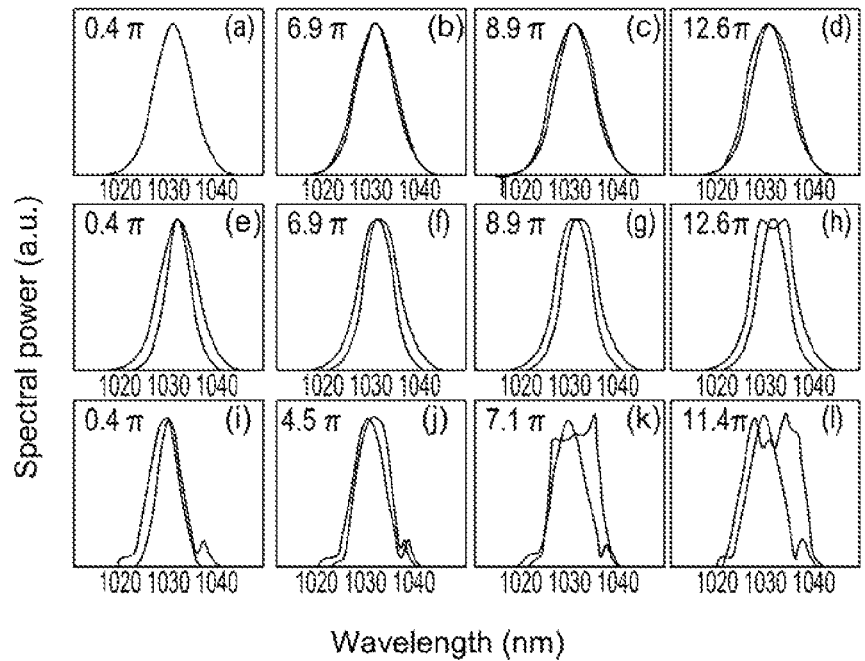
FIG. 2 is a collection of graphs of spectra obtained from numerical simulations (a)-(h) and experiments (i)-(l) for indicated values of $\Phi^{NL}$. The dashed curve in each graph is the spectrum for the seed pulse; the solid curve is the amplified pulse spectrum. The Lorential gain model with gain-bandwidth (a)-(d) $\Delta\lambda_{FWHM}$=100 nm and (e)-(h) $\Delta\lambda_{FWHM}$=12 nm was used in the simulations. Parameters used in the simulations were: $\gamma$=4.3 kW$^{-1}$ m$^{-1}$; $\beta_2$=230 fs$^2$/cm.

The experimental setup illustrated in FIG. 1B consists of the fiber oscillator and two amplification stages, which were employed to provide the necessary gain, though a single high gain stage could also have been employed. All of the fiber is SMF. The 60 MHz oscillator generates weakly stretched pulses with a central wavelength of 1030 nm and 8.5 nm bandwidth. The 0.1 nJ pulses are stretched to 180 ps. The stretched pulses are amplified in two 60 cm long segments of Yb-doped fiber (23,900 ppm Yb concentration, NA of 0.13, core diameter of 6.3 m, confinement factor of 0.6) that are counter pumped by two 980 nm diode lasers. A total of 800 mW is supplied to the first amplifier stage. The pulse energy after amplification is 8 nJ, corresponding to 470 mW of average power. After the first stage, the repetition rate is cut from 60 MHz to 600 kHz with an acousto-optic modulator (AOM). After the AOM, 1.2 nJ is coupled into the second amplification stage, which is also counterpumped by two diode lasers that provide a total of 600 mW in the core of the fiber. The maximum pulse energy at 600 kHz is 360 nJ.

The experimental power spectra of FIGS. 2(i)-2(l) exhibit the same trend with increasing $\Phi^{NL}$ as the simulations of FIGS. 2(e)-2(h). The spectrum flattens and then develops a dip near the central wavelength, while the sides become steep. The shape can be understood intuitively as the combination of the typical phase-modulated shape and spectral limiting by the gain bandwidth. The real part of gain susceptibility (Eq. (2)) limits amplification of frequencies outside of the gain spectrum. Simultaneously the imaginary part will change the phase of the amplified pulse and produce characteristic features even when the pulse is highly chirped. The experimental results agree semiquantitatively with the simulations. The experiments systematically produce larger bandwidths than can be obtained in the simulations, with any value of the gain bandwidth. The best agreement with experiment was obtained with $\Delta\lambda_{FWHM} \sim 15$ nm, which is narrower than published values (~40 nm) for the Yb fiber.

In a separate experiment, a pulse was amplified with a very broad (~100 nm) spectrum and accumulated $\Phi^{NL} < 1$ in Yb fiber to directly measure the gain bandwidth. From the results of that experiment, it was inferred that $\Delta\lambda_{FWHM} \sim 20$ nm. It is important to note that the PGA model fails to produce the characteristic spectral shapes under these experimental conditions. A detailed point is that the observed spectral shift of the amplified pulses toward longer wavelengths can be modeled by shifting the peak of the gain spectral profile.

Figure 3:
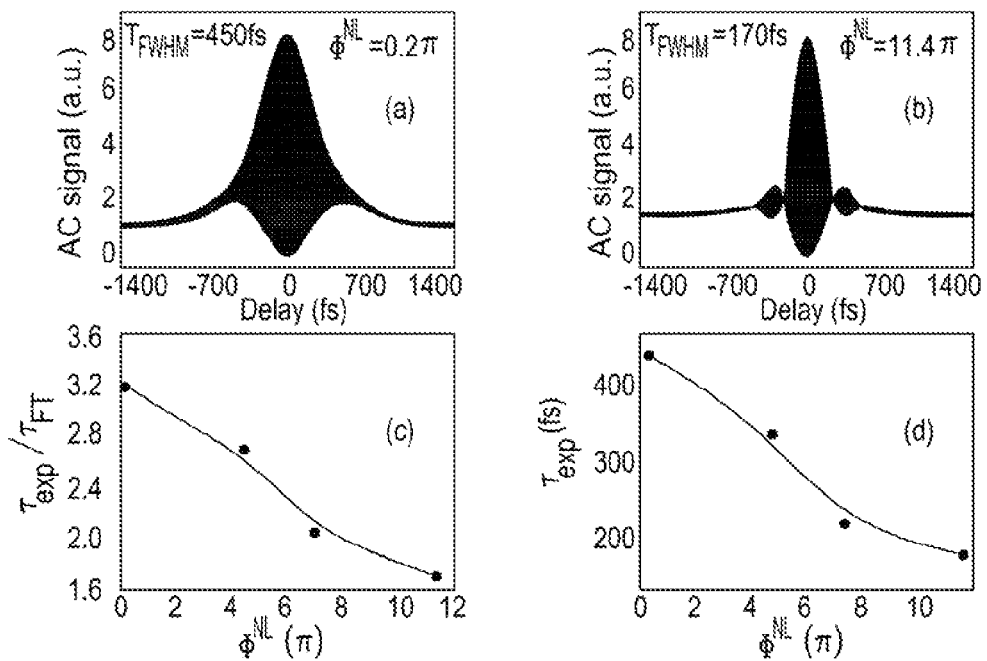
FIG. 3 are graphs showing in (a) and (b), AC measured in the experiments with indicated values of $\Phi^{NL}$; in (c), the ratio of the pulse duration $\Delta\tau_{FWHM}$ measured in the experiment and the FT limited pulse duration for corresponding spectral ((FIGS. 2(i)-2(l)) versus $\Phi^{NL}$ for the pulses out of the second amplification stage; and, in (d), the pulse duration measured in the experiment versus $\Phi^{NL}$. Curves in (c) and (d) guide the eye.

The amplified pulses were dechirped with diffraction gratings with 1600 lines/mm in a double-pass configuration. With negligible $\Phi^{NL}$, the residual TOD of the stretcher and compressor increases the pulse duration to ~450 fs (FIG. 3, graph (a)). With increasing pulse energy and $\Phi^{NL}$, the pulse duration decreases. At the highest energy of 360 nJ ($\Phi^{\Phi NL} \sim 11.4\pi$) the pulse duration has decreased to 170 fs (FIG. 3, graph (b)). Graphs (c) and (d) in FIG. 3 show that the increased bandwidth can be exploited to some extent. The pulse duration approaches the Fourier transform (FT) limit of the broadened spectrum. With $\Phi^{NL} \sim 11.4\pi$, the pulse duration is approximately twice the transform limit, and approximately equal to the seed pulse duration.

These results extend the compensation of the nonlinear phase shift by residual GVD and TOD, as disclosed in Wise et al., to situations where the shape of the pulse spectrum changes substantially. It is important to note that similar spectra were observed in the experiment when the $\Phi^{NL}$ was changed by varying the repetition rate for the second amplification stage. Scaling the output energy up to several microjoules should be possible, with the repetition rate determined by the available pump power.

In subsequent experiments, pulses of duration less than 100 femtoseconds were obtained from the dechirper. This value is well under the 120 femtosecond gain narrowing limit of the ytterbium amplifier and could not have been achieved with the arrangement of elements shown in FIG. 1A or 1B without the substantial modification of the shape of the pulse power spectrum imparted by the large nonlinear phase shifts. The spectral broadening effect was also observed at even higher values of $\Phi^{NL}$ of ~20π or greater.

In summary, numerical calculations and experiments establish that the finite gain bandwidth of an amplifier influences the effects of SPM and modifies the amplified spectrum significantly. Nonlinear phase shifts as large as $\Phi^{NL}$~20π were studied. Experiments agree reasonably well with numerical calculations that include nonlinearity, GVD, TOD and finite gain bandwidth. This model thus provides an adequate description of spectral shaping in amplifiers with up to microjoule levels of pulse energy. The dechirped pulse duration is determined by the compensation of SPM by residual TOD, as well as by spectral shaping in the presence of SPM. As the nonlinear phase shift increases, the Fourier-transform-limited pulse duration decreases, and the pulse dechirped with a dispersive delay line gets closer to the transform limit. The amplified pulses can be dechirped to below the initial pulse duration and below the gain narrowing limit of the fiber amplifier. The results presented here can be scaled to higher energies. A practical, all-single-mode fiber source, with performance comparable with that of a bulk solid-state laser, is possible using the novel technique of the present invention.

Although the invention has been disclosed in terms of a preferred embodiment and variations thereon, it will be understood that numerous other variations and modifications could be made thereto without departing from the scope of the invention as defined in the following claims.

What is claimed is:

1. A method for generating high power ultrashort-pulses using a chirped pulse fiber amplifier, comprising the steps of:
   chirping an input pulse to be amplified by passing said pulse through a pulse stretcher, thereby creating a chirped pulse that is broadened in time;
   modifying said chirped pulse by increasing the power of said pulse with a fiber amplifier to induce an amount of nonlinear phase shift in said pulse which substantiality changes a shape of a power spectrum of said pulse and is sufficient to broaden the power spectrum of said pulse beyond a gain bandwidth of the fiber amplifier; and
   dechirping said pulse by passing said pulse through a pulse compressor to generate a narrowed output pulse having a duration below a gain narrowing limit of said fiber amplifier, wherein said pulse stretcher and said pulse compressor have mismatched dispersion characteristics that combine to induce an amount of third order dispersion in said pulse that is sufficient to compensate for the amount of nonlinear phase shift induced in said pulse by said fiber amplifier.

2. The method of claim 1, wherein said fiber amplifier is formed from ytterbium doped fiber and said output pulse is dechirped to a duration of less than 120 femtoseconds.

3. The method of claim 2, wherein said output pulse has a duration of less than 100 femtoseconds.

4. The method of claim 1, wherein said output pulse has a duration that is shorter than the duration of said input pulse.

5. The method of claim 1, wherein a nonlinear phase shift of 12π or more is induced in said chirped pulse to thereby broaden the power spectrum of said chirped pulse.

6. A chirped pulse fiber amplifier system for generating high power ultrashort-pulses comprising:
   a pulse stretcher for chirping an input pulse to be compressed, thereby creating a chirped pulse that is broadened in time;
   a fiber amplifier for modifying said chirped pulse by increasing the power of said pulse, said amplifier having a gain that is selected to induce an amount of nonlinear phase shift in said pulse which substantiality changes a shape of a power spectrum of said pulse and is sufficient to broaden the power spectrum of said pulse beyond a gain bandwidth of the fiber amplifier; and
   a compressor for dechirping said pulse to generate a narrowed output pulse having a duration below a gain narrowing limit of said fiber amplifier; wherein said pulse stretcher and said pulse compressor have mismatched dispersion characteristics that combine to induce an amount of third order dispersion in said pulse that is sufficient to compensate for the amount of nonlinear phase shift induced in said pulse by said fiber amplifier.

7. The chirped pulse fiber amplifier system of claim 1, wherein said fiber amplifier is formed from ytterbium doped fiber and said output pulse is dechirped to a duration of less than 120 femtoseconds.

8. The chirped pulse fiber amplifier system of claim 7, wherein said output pulse has a duration of less than 100 femtoseconds.

9. The chirped pulse fiber amplifier system of claim 6, wherein said output pulse has a duration that is shorter than the duration of said input pulse.

10. The chirped pulse fiber amplifier system of claim 6, wherein said fiber amplifier is selected to induce a nonlinear phase shift of 12π or more in said chirped pulse to thereby broaden the power spectrum of said chirped pulse.

11. The chirped pulse fiber amplifier system of claim 6, wherein said pulse stretcher is formed from a length of single mode fiber, said fiber amplifier is formed from a length of doped single mode fiber and said compressor is formed from a plurality of gratings.

\* \* \* \* \*